United States Patent
Frapsauce et al.

(10) Patent No.: US 12,187,925 B2
(45) Date of Patent: Jan. 7, 2025

(54) ADHESIVE COMPOSITION WITH RETARDING ADDITIVE

(71) Applicant: Huntsman Advanced Materials Licensing (Switzerland) GmbH, Basel (CH)

(72) Inventors: Astrid Frapsauce, Metz (FR); Catherine Baron, Magstatt-le-Bas (FR)

(73) Assignee: HUNTSMAN ADVANCED MATERIALS LICENSING (Switzerland) GmbH

( * ) Notice: Subject to any disclaimer, the term of this patent is extended or adjusted under 35 U.S.C. 154(b) by 686 days.

(21) Appl. No.: 17/312,422

(22) PCT Filed: Dec. 12, 2019

(86) PCT No.: PCT/EP2019/084878
§ 371 (c)(1),
(2) Date: Jun. 10, 2021

(87) PCT Pub. No.: WO2020/126818
PCT Pub. Date: Jun. 25, 2020

(65) Prior Publication Data
US 2022/0049127 A1    Feb. 17, 2022

(30) Foreign Application Priority Data
Dec. 20, 2018 (EP) .................... 18214799

(51) Int. Cl.
| | | |
|---|---|---|
| C09J 4/00 | (2006.01) |
| C08F 220/06 | (2006.01) |
| C08F 220/18 | (2006.01) |
| C08F 220/28 | (2006.01) |
| C08F 222/06 | (2006.01) |
| C08F 230/08 | (2006.01) |
| C08K 5/18 | (2006.01) |
| C08K 5/3437 | (2006.01) |
| C09J 11/06 | (2006.01) |
| C09J 11/08 | (2006.01) |

(52) U.S. Cl.
CPC ............... *C09J 4/00* (2013.01); *C08F 220/06* (2013.01); *C08F 220/1808* (2020.02); *C08F 220/281* (2020.02); *C08F 222/06* (2013.01); *C08F 230/085* (2020.02); *C08K 5/18* (2013.01); *C08K 5/3437* (2013.01); *C09J 11/06* (2013.01); *C09J 11/08* (2013.01)

(58) Field of Classification Search
USPC .................................. 524/254, 560
See application file for complete search history.

(56) References Cited

U.S. PATENT DOCUMENTS

| | | |
|---|---|---|
| 4,348,503 A | 9/1982 | Bachmann |
| 6,291,593 B1 | 9/2001 | Cheng |
| 6,299,975 B1 * | 10/2001 | Takahira ............... C09J 133/06 524/833 |
| 7,776,963 B2 | 8/2010 | Wang et al. |
| 2010/0236716 A1 * | 9/2010 | Hisha ....................... C09J 4/06 522/113 |

FOREIGN PATENT DOCUMENTS

| | | |
|---|---|---|
| EP | 1609831 A1 | 12/2005 |
| EP | 2275507 A1 | 1/2011 |
| JP | 2009102647 A1 | 5/2009 |
| WO | 99/62977 A1 | 12/1999 |
| WO | 2006/119469 A2 | 11/2006 |

* cited by examiner

*Primary Examiner* — Fred M Teskin

(57) ABSTRACT

The present disclosure relates to an adhesive composition comprising one or more (meth)acrylate ester monomers, a catalyst system and a retarding additive, wherein the retarding additive is a secondary amine; and to the use of secondary amines as retarding agents for adhesive compositions comprising methacrylate monomers.

8 Claims, No Drawings

ADHESIVE COMPOSITION WITH RETARDING ADDITIVE

CROSS-REFERENCE TO RELATED APPLICATIONS

This application is the National Stage application filed under 35 U.S.C. § 371 of International Application No. PCT/EP2019/084878 filed Dec. 12, 2019 which designated the United States of America and which claims priority to European App. Serial No. 18214799.1 filed Dec. 20, 2018. The noted applications are incorporated herein by reference in their entirety.

TECHNICAL FIELD

The present disclosure generally relates to adhesive compositions, in particular adhesive compositions comprising one or more methacrylate monomers, a catalyst system and a retarding additive.

BACKGROUND OF THE INVENTION

Adhesive formulations based on methyl methacrylate (MMA) have been extensively investigated over the past decades resulting in a number of improvements as disclosed, for example, in EP 2 275 507 A1, WO 2006/119469 A2 and U.S. Pat. No. 7,776,963 B2.

One remaining problem of adhesive formulations containing MMA is the pungent odor and flammability of MMA.

EP 1 609 831 A1 discloses compositions using low odor methacrylate monomers instead of MMA to solve this problem.

To replace MMA while maintaining desired adhesion and mechanical properties, mixtures of methacrylate esters need to be used. Catalyst packages to properly cure such monomer mixtures are known from the prior art. U.S. Pat. No. 4,348,503, for example, discloses adhesive compositions with a catalyst system based on an aromatic perester free-radical precursor (preferably together with an amine/aldehyde adduct activator), an organic acid capable of cyclic tautomerism and a transition metal cure accelerator.

However, due to the high reactivity of certain methacrylate monomers, there is a need to slow down reactivity in order to achieve a long open time (as defined below) without impacting mechanical and adhesion properties.

U.S. Pat. No. 6,291,593 B1 discloses retarding additives for methacrylate adhesives on the basis of non-protonic Lewis acids and zinc salts. However, such retarding agents are usually hygroscopic which has a negative impact on the handling of the retarding agents. Such retarding agents usually also have a negative impact on storage stability of the adhesive such as elongation at break.

Therefore, there is a continuous need for retarding agents for adhesive compositions based on methacrylate monomers to slow down the reactivity without any negative impact on the mechanical and adhesion properties.

DISCLOSURE OF THE INVENTION

Unless otherwise defined herein, technical terms used in connection with the present disclosure shall have the meanings that are commonly understood by those having ordinary skill in the art. Further, unless otherwise required by context, singular terms shall include pluralities and plural terms shall include the singular.

All patents, published patent applications, and non-patent publications mentioned in the specification are indicative of the level of skill of those skilled in the art to which the present disclosure pertains. All patents, published patent applications, and non-patent publications referenced in any portion of this application are herein expressly incorporated by reference in their entirety to the same extent as if each individual patent or publication was specifically and individually indicated to be incorporated by reference to the extent that they do not contradict the instant disclosure.

All of the compositions and/or methods disclosed herein can be made and executed without undue experimentation in light of the present disclosure. While the compositions and methods of the present disclosure have been described in terms of preferred embodiments, it will be apparent to those having ordinary skill in the art that variations may be applied to the compositions and/or methods and in the steps or sequences of steps of the methods described herein without departing from the concept, spirit, and scope of the present disclosure. All such similar substitutes and modifications apparent to those skilled in the art are deemed to be within the spirit, scope, and concept of the present disclosure.

As utilized in accordance with the present disclosure, the following terms, unless otherwise indicated, shall be understood to have the following meanings.

The use of the word "a" or "an", when used in conjunction with the term "comprising", "including", "having", or "containing" (or variations of such terms) may mean "one", but it is also consistent with the meaning of "one or more", "at least one", and "one or more than one".

The use of the term "or" is used to mean "and/or" unless clearly indicated to refer solely to alternatives and only if the alternatives are mutually exclusive.

Throughout this disclosure, the term "about" is used to indicate that a value includes the inherent variation of error for the quantifying device, mechanism, or method, or the inherent variation that exists among the subject(s) to be measured. For example, but not by way of limitation, when the term "about" is used, the designated value to which it refers may vary by plus or minus ten percent, or nine percent, or eight percent, or seven percent, or six percent, or five percent, or four percent, or three percent, or two percent, or one percent, or one or more fractions therebetween.

The use of "at least one" will be understood to include one as well as any quantity more than one, including but not limited to, 1, 2, 3, 4, 5, 10, 15, 20, 30, 40, 50, 100, etc. The term "at least one" may extend up to 100 or 1000 or more depending on the term to which it refers. In addition, the quantities of 100/1000 are not to be considered as limiting since lower or higher limits may also produce satisfactory results.

As used herein, the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The phrases "or combinations thereof" and "and combinations thereof" as used herein refers to all permutations and combinations of the listed items preceding the term. For example, "A, B, C, or combinations thereof" is intended to include at least one of: A, B, C, AB, AC, BC, or ABC and, if order is important in a particular context, also BA, CA, CB, CBA, BCA, ACB, BAC, or CAB. Continuing with this example, expressly included are combinations that contain repeats of one or more items or terms such as BB, AAA, CC, AABB, AACC, ABCCC, CBBAAA, CABBB, and so forth. The skilled artisan will understand that typically there is no limit on the number of items or terms in any combination, unless otherwise apparent from the context. In the same light, the terms "or combinations thereof" and "and combinations thereof" when used with the phrases "selected from" or "selected from the group consisting of" refers to all permutations and combinations of the listed items preceding the phrase.

The phrases "in one embodiment", "in an embodiment", "according to one embodiment", and the like generally mean the particular feature, structure, or characteristic following the phrase is included in at least one embodiment of the present disclosure, and may be included in more than one embodiment of the present disclosure. Importantly, such phrases are non-limiting and do not necessarily refer to the same embodiment but, of course, can refer to one or more preceding and/or succeeding embodiments. For example, in the appended claims, any of the claimed embodiments can be used in any combination.

"Open time", as used herein, is meant to be the amount of time after the adhesive is applied onto a first substrate, that the adhesive maintains sufficient tack to bond effectively to a second substrate.

The objective of the present disclosure is solved by an adhesive composition comprising one or more (meth)acrylate ester monomers, a catalyst system and a retarding additive, wherein the retarding additive is a secondary amine.

Preferably, the secondary amine is a secondary amine comprising more than one secondary amine groups, more preferably, a secondary aryl amine.

In a specifically preferred embodiment of the present disclosure, the secondary aryl amine is selected from compounds having formula (1)

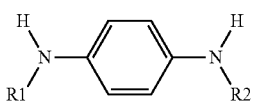
(1)

wherein R1 and R2 are independently selected from $C_6$-$C_{18}$ alkyl groups,
formula (2)

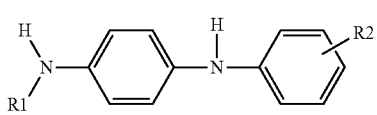
(2)

wherein R1 is selected from $C_6$-$C_{18}$ alkyl groups and R2 is selected from hydrogen or $C_1$-$C_6$ alkyl groups, or formula (3)

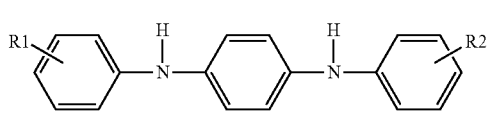
(3)

wherein R1 and R2 are independently selected from hydrogen or $C_1$-$C_6$ alkyl groups.

In another specifically preferred embodiment of the present disclosure, the retarding additive is selected from cyclic secondary amines, most preferably a 2,2,4-trimethyl-1,2-dihydroquinoline polymer.

In one embodiment of the present disclosure, the adhesive composition comprises an amount of 1% to 5% by weight of the retarding additive, based on the total weight of the adhesive composition.

In another preferred embodiment of the present disclosure, the adhesive composition comprises an amount of 10% to 90% by weight of the one or more methacrylate ester monomers, based on the total weight of the adhesive composition.

The present disclosure is also related to the use of a secondary amine or a mixture of secondary amines as a retarding additive for an adhesive composition comprising methacrylate monomers.

The compounds used as retarding additives in the compositions of the present disclosure are known per se in the art, for example, as antioxidants in the rubber industry. Surprisingly, it has now been found that they are very effective in extending the open time of methacrylate-based adhesive compositions without affecting the mechanical and adhesive properties or the storage stability.

The following Table 1 shows preferred compositions for an adhesive composition in accordance with the present disclosure (with both part A (resin part) and part B (hardener part)). Any preferred, more preferred or most preferred weight percentages or weight percentage ranges of any component can be combined with any preferred, more preferred or most preferred weight percentage or weight percentage range of any of the other components.

TABLE 1

| Component | Weight Percent | | |
|---|---|---|---|
| | Preferred | More preferred | Most preferred |
| Ester monomer | 10-90 | 40-60 | 52-58 |
| Acid monomer | 1-12 | 2-6 | 2-3 |
| Polymeric modifier | 5-50 | 10-30 | 10-15 |
| Antioxidant | 0.001-0.2 | 0.005-0.1 | 0.05-0.1 |
| Catalyst system | 0.001-10 | 0.1-4 | 0.5-2 |
| Inhibitor | 0.1-5 | 1-3 | 1-1.5 |
| Toughening agent | 10-40 | 20-30 | 20-25 |
| Retarding additive of the present disclosure | 0.5-5 | 1-3 | 2-2.5 |

The (meth)acrylate ester monomer is usually a mixture of (meth)acrylate ester monomers. These may be methacrylates selected from, for example, hydroxyethyl methacrylate (HEMA), hydroxypropyl methacrylate (HPMA), 2-ethylhexyl methacrylate (EHMA), tetrahydrofuryl methacrylate (THEMA), cyclohexyl methacrylate (CHMA), benzyl methacrylate (BMA), isobornyl methacrylate (IBOMA), isodecyl methacrylate (IDMA), phenoxyethyl methacrylate (PEMA) and butyl methacrylate (BMA), or acrylates selected from, for example, methyl acrylate (MA), butyl acrylate (BA), cyclohexyl acrylate (CHA), hexyl acrylate (HA), 2-ethylhexyl acrylate (EHA), lauryl acrylate (LA) and ethyl acrylate (EA), or mixtures of the above methacrylates, acrylates or both.

Less preferably, (meth)acrylate ester monomers may be used wherein the alcohol portion of the ester groups contains 1 to 8 carbon atoms. Even less preferably, other (meth)acrylate ester monomers known in the art may be used.

The acid monomer, which is a preferred optional component of the adhesive composition of the present disclosure, is preferably methacrylic acid (MAA), less preferably acrylic acid, maleic acid, crotonic acid, and fumeric acid, less preferably other free-radical polymerizable acid monomers known in the art.

The polymeric modifier, which is another preferred optional component of the adhesive composition of the present disclosure, is preferably a core-shell impact modifier, less preferably nitro-rubber particles or powder or polymeric resin which acts as a thixotropic agent and/or toughener. The core-shell impact modifier is preferably a graft copolymer of the "core-shell" type. Preferred core-shell graft copolymers are acrylonitrile-butadiene-styrene (ABS), methacrylate-butadiene-styrene (MBS), and methacrylate-acrylonitrile-butadiene-styrene (MABS). Another preferred core-shell impact modifier is the so-called Acrylic Impact Modifier (AIM), a core-shell product with a butylacrylate rubber core and a polymethylmethacrylate (PMMA) shell.

The antioxidant, another preferred optional component of the adhesive composition of the present disclosure, is preferably an antioxidant from the IRGANOX® series available from BASF, such as IRGANOX® 1098 (N,N'-1,6-hexanediylbis[3,5-bis(1,1-dimethylethyl)-4-hydroxy]-benzenepropanamide] or IRGANOX® 1330 (a 3,3',3',5,5',5'-hexa-tert-butyl-a,a',a'-(mesitylene-2,4,6-triyl)tri-p-cresol), less preferably other antioxidants known in the art.

The inhibitor, which is another preferred optional component of the adhesive composition of the present disclosure, is a free-radical polymerization inhibitor, which increases shelf life and prevents or inhibits premature polymerization and is preferably hydroquinone (HQ) or methylhydroquinone, less preferably butylated hydroxytoluene (BHT) or other known free-radical polymerization inhibitors.

The toughening agent, another preferred optional component of the adhesive composition of the present disclosure, is selected from polymers from the group consisting of polychloroprene, copolymers of butadiene and other monomers, such as acrylonitrile, copolymers of isoprene with styrene, acrylonitrile, acrylate esters, methacrylate esters, copolymers of ethylene and acrylate esters, homopolymers of epichlorohydrine and copolymers of epichlorohydrine and ethylene, polychloroprene with block-copolymers of styrene and butadiene or isoprene and block-copolymers of styrene, diene monomers and mixtures thereof.

Any catalyst system useful for initiation and activation of the polymerization reaction in the adhesive composition of the present disclosure which is known for (meth)acrylate adhesive systems can be used. Preferred catalyst systems to be used with the adhesive composition of the present disclosure may be the ones as described in U.S. Pat. No. 4,348,503. The use of known accelerators and promoters can be advantageous.

Further details can be seen from the following examples.

EXAMPLES

The following materials were used in preparation of the example formulations:
- THFMA: tetrahydrofurfuryl methacrylate, obtained as Sartomer® SR203H available from Sartomer
- EHMA: ethylhexyl methacrylate, obtained as VISIOMER® EHMA available from Evonik
- MAA: methacrylic acid, obtained available from Sigma Aldrich
- Silquest A174: vinyl silane, obtained from Momentive
- Maleic acid: obtained from DSM
- VULKANOX® BHT: butylated hydroxytoluene, obtained from Lanxess
- PARALOID TMS2670J: MBS core shell impact modifier, obtained from Dow
- PARALOID EXL 2300G: AIM core shell, obtained from Dow
- Sartomer® SR348C: ethoxylated bisphenol A dimethacrylate, obtained from Sartomer
- CAB-O-SIL® TS720: treated fumed silica, obtained from Cabot
- Trigonox® C: t-butyl peroxybenzoate, obtained from AkzoNobel
- Soligen copper: obtained from Borchers
- VULKANOX® HS LG: 2,2,4-trimethyl-1,2-dihydroquinoline polymer, obtained from Lanxess
- KGL097: 3,5-diethyl-1,2-dihydro-1-phenyl-2-propylpyridine, obtained from Lake Chemicals The amounts shown in Table 2 are in weight %.

Resin

First, maleic acid was dissolved into THFMA at room temperature (about 25° C.). All components for the resin in Table 2 were added together and mixed using a speed mixer (centrifugal mixer) until a homogenous product resulted.

Hardener

A solution of 200 ppm of soligen copper in EHMA was prepared. All components for the hardener in Table 2 were added together and mixed using a speed mixer (centrifugal mixer) until a homogenous product resulted. VULKANOX® HS LG was ground prior to addition, and then dissolved in post addition into the matrix.

TABLE 2

|  | Example 1 | Example 2 |
| --- | --- | --- |
| Resin |  |  |
| VISIOMER ® EHMA | 10.1 | 10.1 |
| Methacrylic acid | 3 | 3 |
| Silquest A174 | 1 | 1 |
| Solution 6% Maleic acid/94% THFMA | 42 | 42 |
| VULKANOX ® BHT | 0.2 | 0.2 |
| PARALOID TMS2670J | 10 | 10 |
| Sartomer ® SR348 C | 25 | 25 |
| CAB-O-SIL ® TS720 | 6.5 | 6.5 |
| Trigonox C | 2.2 | 2.2 |
| Hardener |  |  |
| VISIOMER ® EHMA | 47.5 | 45.5 |
| Soligen copper solution 200 ppm in Visiomer EHMA | 12.5 | 12.5 |
| KGL097 | 5 | 5 |
| PARALOID EXL 2300G | 8 | 8 |
| Sartomer ® SR348 C | 25 | 25 |
| CAB-O-SIL ® TS720 | 2 | 2 |
| VULKANOX ® HS LG | — | 2 |

TABLE 3

| Test |  | Example 1 | Example 2 |
| --- | --- | --- | --- |
| Exotherm test | Time to 32° C. | 1 min | 3 min 30 s |
|  | Maximum temperature | 140° C. | 135° C. |
|  | Time to max exotherm | 4 min | 7 min 30 s |
| Lap Shear | Stainless | 23 CF/SCF | 20 CF |

TABLE 3-continued

| Test | | Example 1 | Example 2 |
|---|---|---|---|
| Strength | Steel | | |
| | CFRP | 13 CF | 11 CF |
| | ABS | 5 CF/SDF | 5 CF |
| Tensile properties | Tensile strength (MPa) | 32 | 30 |
| | Modulus (MPa) | 880 | 860 |
| | Elongation at break (%) | 12 | 10 |
| DMA | Glass transition temperature | 69° C. | 68° C. |

Tests performed on mix ratio 1:1 by weight of resin and hardener

Exotherm Test at 23° C.

Mix 7 g resin+7 g hardener into a cup, then transfer into a silicon mold and follow exotherm reaction over time with a thermocouple.

Record time to reach 32° C., maximum temperature, and time to reach maximum temperature.

Lap Shear Strength (ISO 4587)

The CFRP (Carbon Fibre Reinforced Polymer) and ABS (Acrylonitrile Butadiene Styrene) substrates were degreased by wiping with isopropanol and abraded. The aluminum substrates were sandblasted and rinsed with acetone. The adhesive composition was dispensed onto one surface of the substrate pair. The two surfaces were mated and held to each other with a compressor-type tubing clamp. The overlap area was 25.0 mm×12.5 mm. The bonded joints were left to cure for 24 h at 23° C. The clamps were then removed and the bonded joints were tested for tensile shear strength (TSS) according to ISO 4587 at crosshead speed of 10 mm/min. The TSS values were recorded in megapascals (MPa). The average value of 3 tested joints is reported.

Tensile Properties (ISO 527)

A plate of 2 mm thickness was prepared under press and cured for 1 week at room temperature (about 25° C.) before to be tested according to ISO 527.

Dynamic Mechanical Analysis (ISO 6721)

Samples from the same plate were tested in torsion according to ISO 6721 from −100 to +150° C. to determine glass transition temperature.

The above test results show that the addition of the retarding additive in the composition of Example 2 according to the present disclosure slows down the reactivity of the system without impacting either the adhesion, tensile properties or glass transition temperature.

The above-disclosed subject matter is to be considered illustrative, and not restrictive, and the appended claims are intended to cover all such modifications, enhancements, and other embodiments, which fall within the true scope of the present disclosure. Thus, to the maximum extent allowed by law, the scope of the present disclosure is to be determined by the broadest permissible interpretation of the following claims and their equivalents, and shall not be restricted or limited by the foregoing detailed disclosure.

The invention claimed is:

1. An adhesive composition comprising one or more (meth)acrylate ester monomers, a catalyst system a retarding additive, a polymeric modifier, and a free-radical polymerization inhibitor, wherein the retarding additive is a secondary amine and the polymeric modifier is present in an amount ranging from 5 to 50 wt % based on the total weight of the composition, the retarding additive is effective to extend the open time of the adhesive composition without affecting the mechanical and adhesive properties or storage stability thereof, the catalyst system is based on an aromatic perester free-radical precursor, an organic acid capable of cyclic tautomerism and a transition metal cure accelerator.

2. The adhesive composition according to claim 1, wherein the secondary amine is a secondary amine comprising more than one secondary amine group.

3. The adhesive composition according to claim 2, wherein the secondary amine is a secondary aryl amine.

4. The adhesive composition according to claim 3, wherein the secondary aryl amine is selected from compounds having:

formula (1)

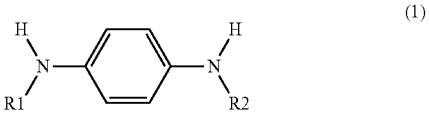

wherein R1 and R2 are independently selected from $C_6$-$C_{18}$ alkyl groups, formula (2)

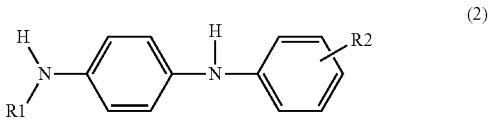

wherein R1 is selected from $C_6$-$C_{18}$ alkyl groups and R2 is selected from hydrogen or $C_1$-$C_6$ alkyl groups, or formula (3)

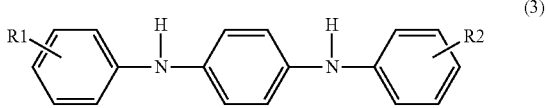

wherein R1 and R2 are independently selected from hydrogen or $C_1$-$C_6$ alkyl groups.

5. The adhesive composition according to claim 1, wherein the retarding additive is selected from cyclic secondary amines.

6. The adhesive composition according to claim 5, wherein the cyclic secondary amine is a 2,2,4-trimethyl-1,2-dihydroquinoline polymer.

7. The adhesive composition according to claim 1, wherein the retarding additive is present in an amount of 1% to 5% by weight, based on the total weight of the adhesive composition.

8. The adhesive composition according to claim 1, wherein the one or more (meth)acrylate ester monomers are present in an amount of 10% to 90% by weight, based on the total weight of the adhesive composition.

* * * * *